S. WORLICZEK.
ALARM DEVICE FOR MEASURING INSTRUMENTS.
APPLICATION FILED APR. 30, 1912.
1,057,313.
Patented Mar. 25, 1913.
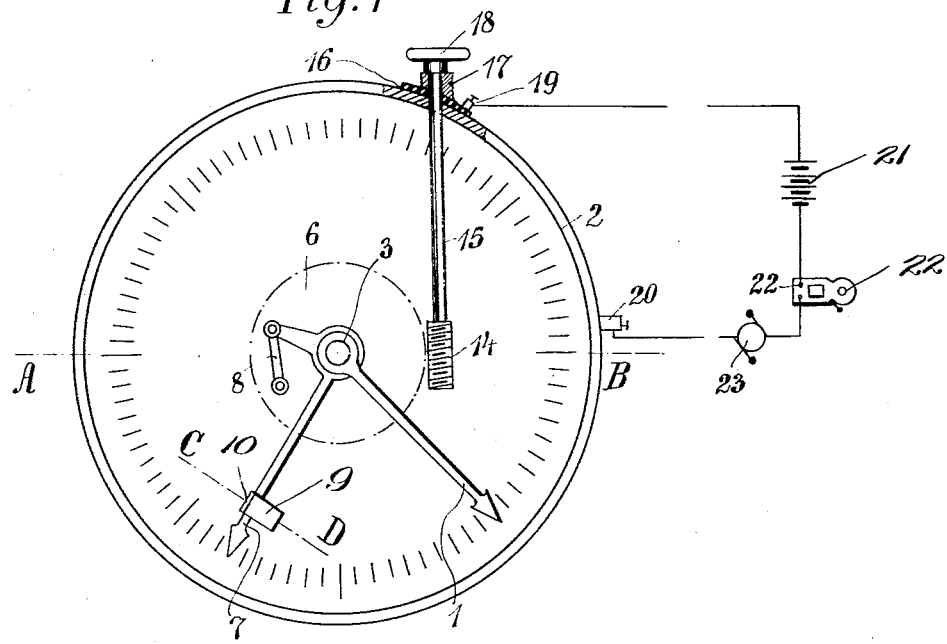
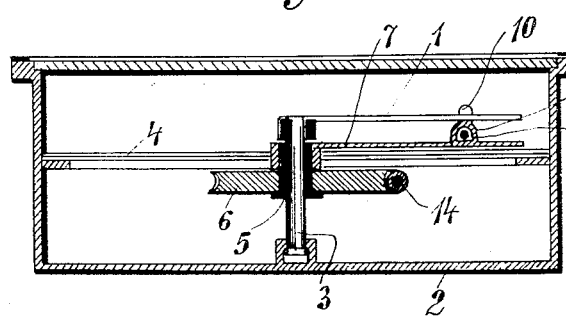
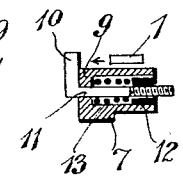

UNITED STATES PATENT OFFICE.

STEFAN WORLICZEK, OF ZOLKIEW, AUSTRIA-HUNGARY.

ALARM DEVICE FOR MEASURING INSTRUMENTS.

1,057,313. Specification of Letters Patent. Patented Mar. 25, 1913.

Application filed April 30 1912. Serial No. 694,068.

*To all whom it may concern:*

Be it known that I, STEFAN WORLICZEK, a subject of the Emperor of Austria-Hungary, and residing at Zolkiew, Galicia, Austria-Hungary, have invented certain new and useful Improvements in Alarm Devices for Measuring Instruments, of which the following is a specification.

This invention relates to signal devices for working in combination with measuring instruments such as pressure gages and the like.

Electric signal devices for pressure gages and the like are known, in which the gage pointer is connected with one pole of a source of current in such a manner that a circuit is closed by the contact of this pointer with an adjustable alarm pointer connected to the other pole. In this known device the alarm pointer is set by means of a knob on its spindle, which has the drawback that the alarm pointer can be easily spontaneously shifted, with the result that the alarm signal will be given either on attainment of a quite permissible pressure or not until the maximum allowable pressure has been exceeded.

The object of the present invention is to overcome this drawback and it consists in an improved alarm device for the purpose referred to, in which the alarm pointer forms part of a bent lever having two arms of unequal length, of which the long arm constitutes the pointer while the short arm can be adjusted from a knob through the agency of worm gearing.

Since the worm wheel cannot drive the worm, spontaneous shifting of the alarm pointer, which is connected to the worm wheel, is rendered impossible. In spite of the low velocity ratio of the worm gearing the alarm pointer can be set with as much rapidity as if the knob were directly connected with the alarm pointer, owing to the formation of the latter as a lever having arms of unequal length, the high velocity ratio hereby derived compensating the low velocity ratio of the worm gearing. The compact nature of the mechanism renders the improved pressure gage not more bulky than gages of ordinary construction.

One embodiment of the invention is illustrated by way of example in the accompanying drawings, in which—

Figure 1 is an elevation of the pressure gage and alarm device, Fig. 2 a vertical section at A—B of Fig. 1 and Fig. 3 a detail in section on a larger scale at the line C—D of Fig. 1.

The gage pointer 1 is fixed on a spindle 3 journaled in the case 2 and in conductive connection with the case this pointer moving over a scale 4. The mechanism by means of which this spindle is rotated by the alterations in the pressure to be measured, is not shown in the drawings. On the spindle there is also mounted a sleeve 5 of insulating material on which are loosely mounted a worm wheel 6 and the alarm pointer 7. The alarm pointer 7 is part of a lever having two arms of unequal length, the long arm forming the indicating pointer and the short arm being connected to the worm wheel by means of a link 8. The alarm pointer carries a sleeve 9 in which a hook shaped contact piece 10 can be inserted in tangential direction, the hook part of which projects into the path of the gage pointer 1 (Fig. 3). The shank 11 of the contact piece is screw threaded at the end and provided with a nut 12. Between this nut and the bottom of the sleeve 9 a spiral spring 13 is coiled about the said shank of the contact piece.

A worm 14 mounted on a spindle 15, meshes with the worm wheel 6. The spindle 15 is supported in a bearing 17 mounted on the casing but insulated therefrom by an insulating washer 16, so that the spindle 15 is insulated from the case. The outside end of the spindle 15 carries a knob 18 by means of which the alarm pointer 7 can be adjusted. The bearing 17 carries a terminal 19 and the case a terminal 20. The terminal 19 is connected with one pole of a source of E. M. F. 21 and the terminal 20 with the other pole. An alarm device 22 such as a bell is inserted in the circuit and also a motor 23 for driving the feed pump, or a starting relay for the said motor.

To insure that the alarm device will be actuated on attainment of a definite pressure, the alarm pointer 7 is set to the desired place on the scale by means of the knob 18. When the pressure rises so that the gage pointer 1 attains the contact piece 10 of pointer 7, which will take place when alarm pointer 7 coincide the circuits should be closed and the alarm signal produced, and the current flows from one pole of the source of E. M. F. 21 to the terminal 19, the bearing 17, the spindle 15, the worm 14, the worm wheel 6, the link 8, the alarm pointer 7, the gage pointer 1, the spindle 3, the case 2, the terminal 20, the motor or starter relay 23, the alarm device 22, and thence to the other pole of the source of E. M. F.

If the pressure rises still further the gage pointer 1 carries with it the contact piece 10 of the alarm pointer 7 as far as allowed by the spring of the contact piece so that the contact is maintained without preventing the gage pointer from further rotation.

It is obvious that the improved alarm device may be applied not only to pressure gages but to any measuring instrument in which an alarm device has to be actuated when the instrument pointer or the like attains a certain position.

Having now described my invention what I claim as new and desire to secure by Letters Patent is:—

1. In a measuring instrument, an alarm device comprising a bent lever with arms of unequal length and of which the long arm forms the alarm pointer, a worm wheel connected to the short arm of the lever, a worm meshing with the worm wheel, an external adjusting knob on the worm spindle, an instrument pointer and an alarm circuit between the alarm pointer and the instrument pointer.

2. In a measuring instrument, an alarm device comprising a bent lever with arms of unequal length and of which the long arm forms the alarm pointer, a worm wheel connected to the short arm of the lever, a worm meshing with the worm wheel, an external adjusting knob on the worm spindle, an instrument pointer, a yielding contact on the alarm pointer projecting into the path of the instrument pointer, and an alarm circuit between the alarm pointer and the instrument pointer.

3. In a measuring instrument, a central spindle carrying the instrument pointer, an insulating sleeve on the spindle, a worm wheel loosely mounted on the sleeve, a bent lever loosely mounted on the sleeve having arms of unequal length of which the long arm forms the alarm pointer, a link connecting the short arm to the worm wheel, a worm meshing with the worm wheel, an external adjusting knob on the worm spindle, a yielding contact on the alarm pointer projecting into the path of the instrument pointer, and an alarm circuit between the alarm pointer and the instrument pointer closed when this latter encounters the contact on the alarm pointer.

4. In a measuring instrument, the combination with a casing having a dial therein; a spindle journaled in said casing; and an instrument pointer fixed to said spindle and adapted to rotate above the dial, of an alarm device comprising an insulating sleeve on said spindle in rear of said instrument pointer; an alarm pointer loosely mounted on said sleeve; a short arm integral with said alarm pointer and projecting angularly therefrom; a worm wheel loosely mounted on said sleeve in rear of said alarm pointer; a link pivoted at one end to said arm and at its opposite end to said worm wheel; a worm meshing with said worm wheel; an external adjusting knob on the worm spindle; a spring yielding contact on said alarm pointer projecting into the path of said instrument pointer; and an alarm circuit between said alarm pointer and said instrument pointer closed when the latter encounters the contact on the alarm pointer.

In testimony whereof I have signed my name to this specification in the presence of two subscribing witnesses.

STEFAN WORLICZEK.

Witnesses:
 STANISLAW RITTER VON DZBARISKI.
 ADA MARIA BERGER.